(12) United States Patent
Kars

(10) Patent No.: US 6,820,460 B1
(45) Date of Patent: Nov. 23, 2004

(54) SYSTEM FOR MONITORING THE WORKING OF ROTATION OR ROLL DAMPERS

(75) Inventor: Jan Willem Kars, Mijnsheerenland (NL)

(73) Assignee: Koni B.V. (NL)

( * ) Notice: Subject to any disclaimer, the term of this patent is extended or adjusted under 35 U.S.C. 154(b) by 0 days.

(21) Appl. No.: 09/690,134

(22) PCT Filed: Apr. 19, 1999

(86) PCT No.: PCT/NL99/00224

§ 371 (c)(1),
(2), (4) Date: Oct. 17, 2001

(87) PCT Pub. No.: WO99/54704

PCT Pub. Date: Oct. 28, 1999

(30) Foreign Application Priority Data

Apr. 17, 1998 (NL) .............................. 1008921

(51) Int. Cl.[7] .............................................. G01H 13/00
(52) U.S. Cl. ..................................................... 73/11.06
(58) Field of Search ........................ 73/117, 116, 11.04, 73/11.06; 295/32–35

(56) References Cited

U.S. PATENT DOCUMENTS 5,086,649 A    2/1992    Yamaoka

FOREIGN PATENT DOCUMENTS

| DE | 3316011 | 11/1984 |
|----|---------|---------|
| DE | 19502670 | 7/1996 |
| EP | 0184960 | 6/1986 |
| EP | 0334412 | 9/1989 |
| EP | 0855327 | 7/1998 |
| FR | 2312402 | 5/1975 |
| GB | 2093947 | 9/1982 |

OTHER PUBLICATIONS

Patent Abstracts of Japan, vol. 18, No. 319 (M–1623), Jun. 17, 1994 & JP 06 072328 (East Japan Railway Co), Mar. 15, 1994.

Patent Abstracts of Japan, vol. 96, No. 5, May 31, 1996 & JP 08 015098 (Sumitomo Metal Ind Ltd.) Jan. 19, 1996.

*Primary Examiner*—Edward Lefkowitz
*Assistant Examiner*—Maurice Stevens
(74) *Attorney, Agent, or Firm*—Bachman & LaPointe, P.C.

(57) ABSTRACT

System for monitoring the working of rotation or roll dampers in rail vehicles provided with a superstructure which rests on at least two chassis, in which the motions which can be generated as a consequence of the self-seeking character of a wheel set are damped in at least one of the chassis by the said rotation or roll dampers which are mounted between chassis and superstructure, on one side each of the chassis. The working of the dampers is monitored by means of suitable sensors, which emit electric signals dependent upon the working of the particular damper. The system is provided with means for comparing the signals of both sensors and for determining a differential signal. The system is further provided with means by which the differential signal is compared with a reference value, which means emit a warning signal if the differential signal exceeds the said reference value.

8 Claims, 3 Drawing Sheets

SYSTEM FOR MONITORING THE WORKING OF ROTATION OR ROLL DAMPERS

The invention relates to a system for monitoring the working of yaw motion dampers in rail vehicles, which rail vehicles are provided with a superstructure which rests on at least two chassis, each provided with one or more wheel axles, in which yaw motions which can arise during running between superstructure and chassis are damped in at least one of the chassis by the said yaw motion dampers which are mounted between the chassis and the superstructure, one on each side of the chassis.

An important factor in assessing the safety and travel-worthiness of rail vehicles, especially rail vehicles which are intended to be used in trains which travel at high speed, is the stability of the rail vehicle. A vehicle can be deemed stable if during running it suffers no (or virtually no) roll or rotation motions, i.e. motions in a direction which does not coincide with the ideal forward motion direction defined by the rail shortly indicated as yaw motions. The stability can be negatively influenced by a variety of factors.

In the first place, owing to the shaping of rail bars and wheel flanges, each vehicle will try by nature to proceed to ride in the middle of the two rail bars. That ideal will seldom, however, be achieved and will only be approached by a self-seeking mode of behaviour. In other words, a rail vehicle will by nature follow a somewhat swaying track. For the purpose of damping the thereby generated roll and rotation motions of the superstructure relative to the chassis, it is known to make use of roll or rotation dampers which are fitted between superstructure and chassis. An example of just such a configuration can be found in DE 19 502 670. In this publication, the damper is adjustable and is controlled by an electronic circuit which receives signals from an acceleration transducer acting in the transverse direction.

It follows from the above that the correct functioning of these roll or rotation dampers is of great importance to maintaining the stability of the vehicle.

At the present moment, it is usual to inspect and/or replace shock absorbers after a certain running time. The running time in question is determined on the basis of historical experience, and in general a certain safety margin will be observed. This implies that in very many cases shock absorbers will be replaced or inspected which are still functioning well and would probably have been able to continue to fulfil their function for a good deal longer. Should the shock absorbers be inspected (which is not always possible), it will in many cases be established following completion of the inspection that the time and cost devoted to the inspection had not in fact been necessary since the shock absorber is continuing to function well.

This problem plays an important role, in particular, in situations in which it is endeavoured to keep the particular vehicle in operation as long as possible without interruptions, such as in the case of rail vehicles, especially rail vehicles which form part of high-speed trains. Such vehicles generally comprise a superstructure which rests, via two bearing systems, on two chassis. Between the superstructure and the chassis there are rotation or roll dampers, which must ensure that the chassis does not suffer the roll motions which may be result from the seeking behaviour of the wheels.

The system described in the above first paragraph, by means of which the sound functioning of a damper can be monitored is described in GB 2 093 946. In this prior art system, the particular sensors comprise a pressure sensor which is installed in the damper and a speed transducer which is also installed in the damper. In addition, an electronic circuit is present, by which the electric signals delivered by the two sensors are processed and compared with each other. If excessively large variances arise, then an indicator is triggered to indicate that the damper is functioning outside its tolerance range.

The sound functioning of such a system is heavily dependent upon the calibration of the electronic circuit by which the signals of the two sensors are processed.

The object of the invention is now to indicate in what way the monitoring of rotation or roll dampers in rail vehicles can be realised such that it is possible reliably to establish when a damper might have to be repaired or replaced.

This object is realized in a system of the sort stated in the introduction which according to the invention is characterized in that the system is further provided with means for comparing the differential signal with a reference value, which means emit a warming signal if the differential signal exceeds the said reference value.

Owing to the fact that the dampers are not monitored individually but are monitored as a group and the measurement signals of the sensors within the group are compared with each other, the underperformance of a damper from the group already quickly becomes apparent.

The output signal of the comparison means can be transferred via cables to a further circuit for processing this signal or can possibly be transported in a wireless manner.

It is preferable in both cases that the system should further be provided with means by which the differential signal is compared with a reference value, which means emit a warning signal if the differential signal exceeds the said reference value.

It is noted that a circuit for processing sensor signals is known per se from U.S. Pat. No. 4,141,236. In this publication, the basis is provided by a damper of the same type as described in the above-named British publication GB-2 093 946. To this is added a circuit by which the signals of both sensors are converted into a possible alarm signal. Here however, it is a matter of sensors which are combined with a single damper.

In a preferred embodiment, the sensor for each damper is formed by at least one force transducer which is connected to the outside of the particular damper, or at least one force transducer which is fitted inside the particular damper, measures being taken to transfer the signal emitted by the sensor to outside the damper.

The said force transducers can at least partly be constructed using strain gauges.

If a change in damper characteristic is not expressed in the damping force but in the associated damper speed, or if the use of force transducers is less desirable for other reasons, then it may be preferable that the sensor for each damper should be formed by at least one pressure transducer which is fitted inside the particular damper, measures being taken to transfer the signal emitted by the sensor to outside the damper.

According to another alternative, the sensor for each damper is formed by an acceleration transducer acting in the longitudinal direction, which is fastened to the chassis in the vicinity of the particular damper.

In a further developed embodiment, in respect of each damper an acceleration transducer in the longitudinal direction of the damper is fastened to the chassis, which acceleration transducer emits an output signal to a series circuit of an amplifier and an integrator, for each damper the output signal of the working-pressure sensor or damping-force sensor being divided in a divider circuit by the integrated output signal of the acceleration transducer in the longitudinal direction of the damper and the resultant quotients being compared with each other in the comparator.

Although the above-mentioned embodiments can be realised totally by means of analogue electronics, it is especially preferable, owing to the low frequencies of the roll motions and the consequentially long averaging periods, to use digital methods. The use of very large, accurate and hence expensive capacitors, for example, can thereby be avoided.

It is therefore preferable that the two circuits for determining an effective value of the filter output signal and the comparator should be realised as digital circuits and as a programmed processor respectively and that an analogue/digital converter is included after each band filter.

It is also preferable that the two band filters, the two circuits for determining an effective value of the filter output signal and the comparator are realised as digital circuits and as a programmed processor respectively and that an analogue/digital converter is included after each amplifier.

It is further preferable that the integrators, the divider circuits and the comparator are realised as digital circuits and as a programmed processor respectively and that the amplifiers for amplifying the signal of the acceleration transducers in the longitudinal direction of the dampers are followed by an A/D converter.

To enable the digital filters in the abovenamed embodiment to be accurately adjusted and possibly fine-tuned during operation, it is preferable that the chassis is provided with an acceleration transducer which is fastened such that the acceleration of the chassis in the transverse direction is measured, and that the output signal of the acceleration transducer is fed to the series circuit of an amplifier, an analogue/digital converter and a digital spectrum analyser by which the band width of the central roll frequency is determined, and that the digital filters are readjusted on the basis of the determined band width.

The invention will be discussed in greater detail below with reference to the appended figures.

Figure 1:
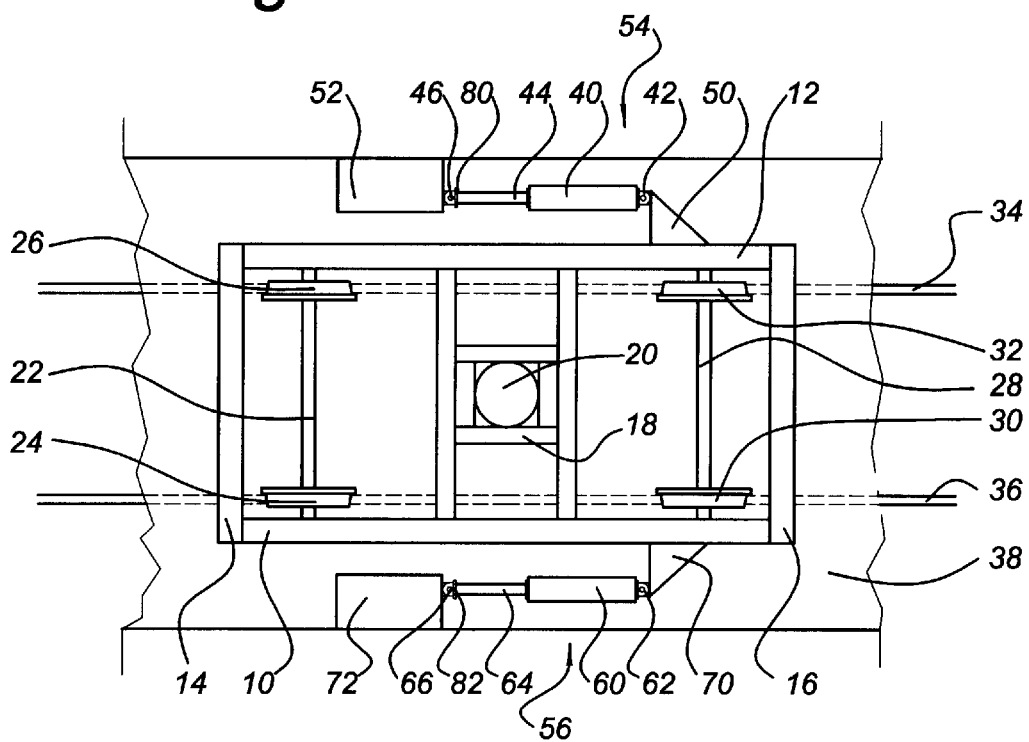
FIG. 1 shows a first embodiment of the invention, in which each damper is provided with a force transducer.

FIG. 1 shows a top view of a railway coach at the site of one of the chassis. In this example, the particular chassis comprises the longitudinal members 10 and 12, the transverse members 14 and 16 and the bearing support 18. The bearing support 18 once again comprises various parts in its own right, which parts are not however separately denoted since they are of no individual importance to the invention. The bearing which is borne by the support member 18 is denoted by 20. The chassis is further provided with an axle 22, carrying the wheels 24 and 26, and the axle 28, carrying the wheels 30 and 32. During running, the wheels run over the rails 34 and 36 indicated by dotted lines.

It is noted that various bearing constructions are by now known for use in railway coaches. Furthermore, in place of bearings, bearing constructions are also known which are formed by spring constructions. In all cases, the invention can however be applied to the rotation or roll dampers present.

The superstructure of the coach is only partially visible and is denoted by 38. As stated, the superstructure is centred on the chassis by means of the bearing 20. Between the chassis and the superstructure two roll dampers 54 and 56 are fitted, which are visible on the top side and the bottom side of the figures. The roll damper 54 depicted on the top side is provided with the housing 40, having at the one end a fastening eye 42 and having the piston rod 44 projecting at the other end, with at the free end the fastening eye 46. The damper is pivotably fixed by the fastening eye 42 to the damper support 50, which forms part of the chassis, and the damper is pivotably-fastened by the fastening eye 46 to the damper support 52, which forms part of the superstructure 38 of the coach.

Similarly, the damper 56 depicted on the bottom side comprises the housing 60, having the fastening eye 62 at the one end and at the other end the piston rod 64 with at the free end the fastening eye 66. This damper is pivotably-fastened by the fastening eye 62 to the damper support 70 forming part of the chassis and is connected by the fastening eye 66 to the damper support 72 which forms part of the superstructure 38.

The wheels 24, 26, 30 and 32 are provided with a wheel profile having rounded flanges, which is known per se. As is known, the shape of the wheels is chosen such that the wheels are self-tracking, that is to say that they endeavour to keep the axle to which they are fastened centred on the middle of the rail track. As is also known, this self-tracking behaviour can give rise to swaying motions in the chassis. In particular, swaying motions relative to the centre point of the bearing 20 must in this case be envisaged. The purpose of these dampers is to damp heavily the motions in the chassis and thereby realise a smooth running of the chassis as a whole.

The fitting of roller dampers between a chassis and the superstructure of a vehicle and the effect of this is known per se and a detailed description thereof is therefore considered superfluous.

As has already been stated above, the invention endeavours to monitor the functional state of the two dampers in such a way that a message is obtained as soon as a damper is no longer functioning optimally within pre-set tolerance limits. To this end, sensors are fitted to the dampers, which sensors are denoted in the figures by 80 and 82. These sensors can comprise strain gauges by which the forces generated in the particular piston rod 44 and 64 are measured. Instead of strain gauges, another force measuring system may be used.

Figure 2:
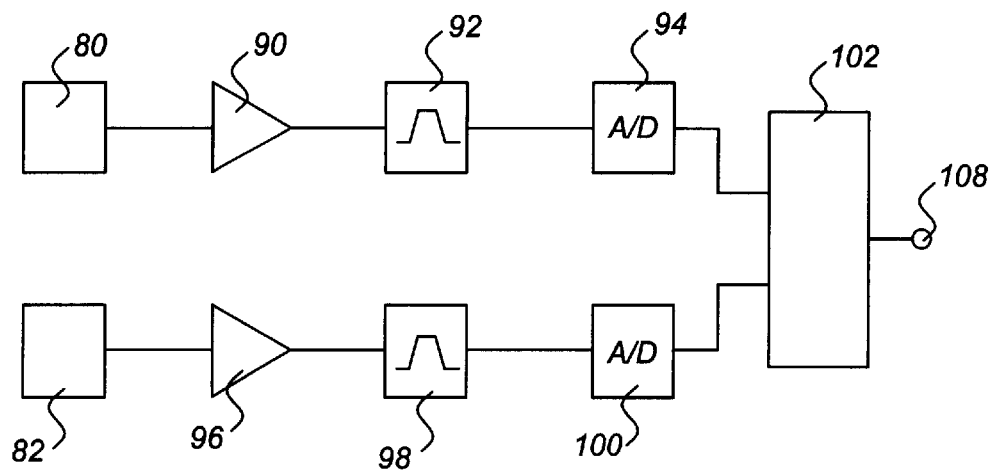
FIG. 2 shows the electronic circuit belonging to the embodiment according to FIG. 1.

FIG. 2 shows the electric circuit by which the signals of these sensors 80 and 82 are processed. The signals of the sensor 80 are first of all amplified by a predetermined factor in an amplifier 90, then guided through a band-pass filter 92 and converted in the analogue/digital converter 94 into digital signals. The output signals of the sensor 82 are amplified in the amplifier 96, guided through a band-pass filter 98 and subjected to an analogue/digital conversion in the converter 100. The output signals of the two A/D converters 94 and 100 are fed to the processor 102.

The band-pass filters 92 and 98 ensure that only signals which lie within the roll frequency range are passed through to the processor 102 and that all other disturbance signals are heavily attenuated.

If both roll dampers 54 and 56 are functioning correctly, then it may be assumed that, whenever the chassis rolls, the damper motions and hence also the damper forces on both sides of the chassis are in principle equal. This can be determined by, for example, looking over a sufficiently long time span at the average or effective value of these damper forces or at some other relevant value of these damper forces. The working of the processor 102 is now based on this assumption. In the processor 102, the effective value (or average value) of the two input signals is determined over a relatively large time period. The effective values obtained are then compared with each other. As long as the two signals are equal to each other within predetermined tolerance limits, it may be assumed that both roll dampers are functioning well. However, as soon as one of the two signals changes in such a way that the difference between the two signals exceeds a predetermined tolerance limit, then the processor 102 emits a signal at the output 108, by which it is evident to the outside world that one of the two roll dampers is no longer functioning correctly and therefore needs to be replaced or repaired.

It will be evident that the electronic circuit, for example, can be fastened anywhere to the chassis, wires having to be fitted between the sensors 80, 82 and the processor 102. These wires are not however depicted in the figure.

Although in FIG. 2 the actual signal processing takes place with digital signals, it will be evident that an analogue circuit can also be used, by which the relative values, for example the average, of both filter output signals are formed over a lengthy period and are compared with each other. In view of the low frequencies of the signals (approximately in the range 2–10 Hz), a digital realisation as in FIG. 2 is preferable.

The roll frequency of the chassis may vary for each chassis, depending on the loading of the coach, the speed of travel and a number of disturbance influences. In order not to lose a useful signal, the pass-through bands of the two filters must consequently be chosen such that they are sufficiently wide. A solution which allows much narrower pass bands to be used is shown in FIGS. 3 and 4.

Figure 3:
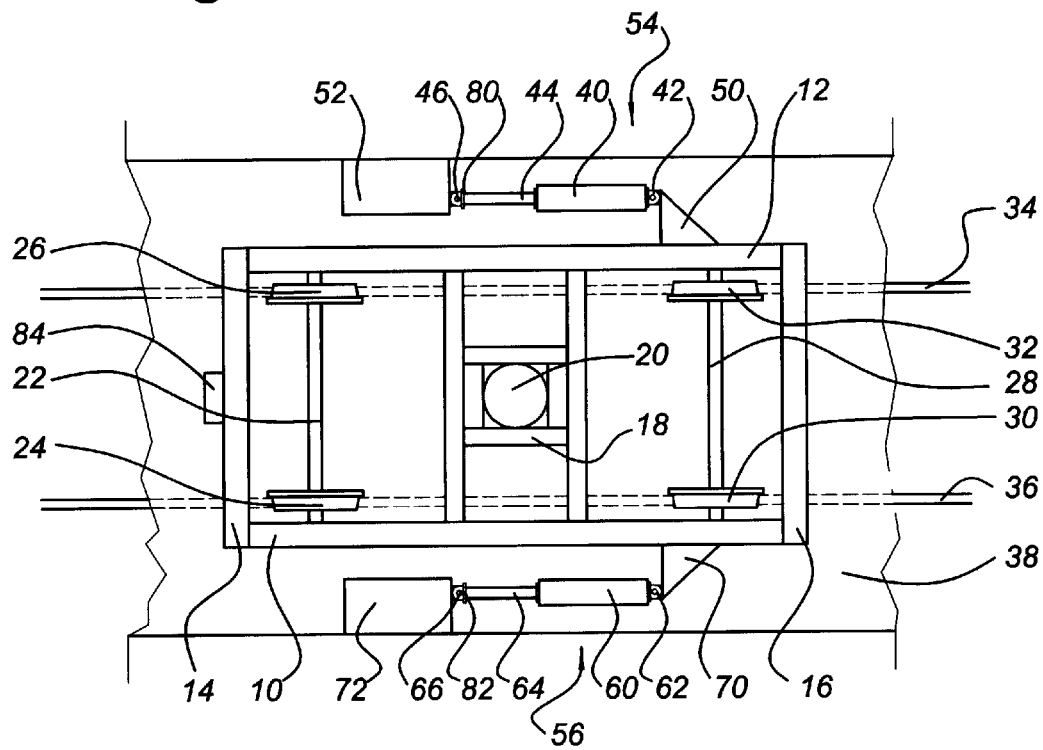
FIG. 3 shows a second embodiment of the invention, in which each damper is provided with a force transducer and the chassis is provided with an acceleration transducer in the transverse direction, as is usual in chassis monitoring.

With the exception of the added acceleration transducer 84, FIG. 3 is wholly identical to FIG. 1, for which reason only a few reference numbers are indicated.

The acceleration transducer 84 is mounted on a transverse member 14 of the chassis and is designed to record accelerations which are generated in the transverse direction. Such an acceleration transducer is in many cases already present for other purposes, for example for roll monitoring. The output signal of this transducer can be used to harmonise the pass-through bands of the two filters such that the band is just sufficient to let through the desired useful signal.

Figure 4:
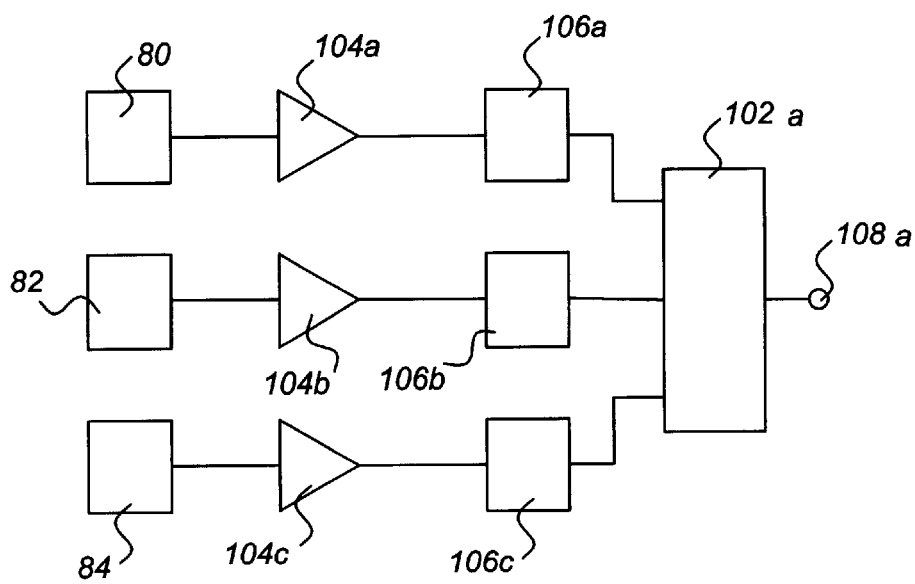
FIG. 4 shows the electronic circuit belonging to the embodiment according to FIG. 3.

FIG. 4 shows the electronic circuit which is used in this case. The signal of the sensor 80 is once again amplified in the amplifier 104A and then digitized in the A/D converter 106A. Similarly, the signal of the sensor 82 is amplified in the amplifier 104B and then digitized in the A/D converter 106B. The signal of the acceleration transducer 84 is amplified in the amplifier 104C and digitized in the A/D converter 106C. The three digitized signals are fed to a processor 102A.

This processor is programmed such that the signals of the force transducers 80 and 82 are subjected to a band-pass filter operation. The relevant value (for example the average) of both signals is then determined over a lengthy period and these values are compared with each other. Algorithms for the realisation of a filter operation and for the determination of a long-term average are assumed to be known and are not therefore discussed in detail. In particular, use is here made of a filter algorithm of which a number of parameters can be changed such that the pass-through band of the filter is modified. The digitized signal of the acceleration transducer 84 is subjected to a spectrum analysis, by which can be determined the band within which the central roll frequency varies. The resultant data are then used periodically to readjust the parameters of the filter algorithms so that an optimal filter effect is obtained.

Figure 5:
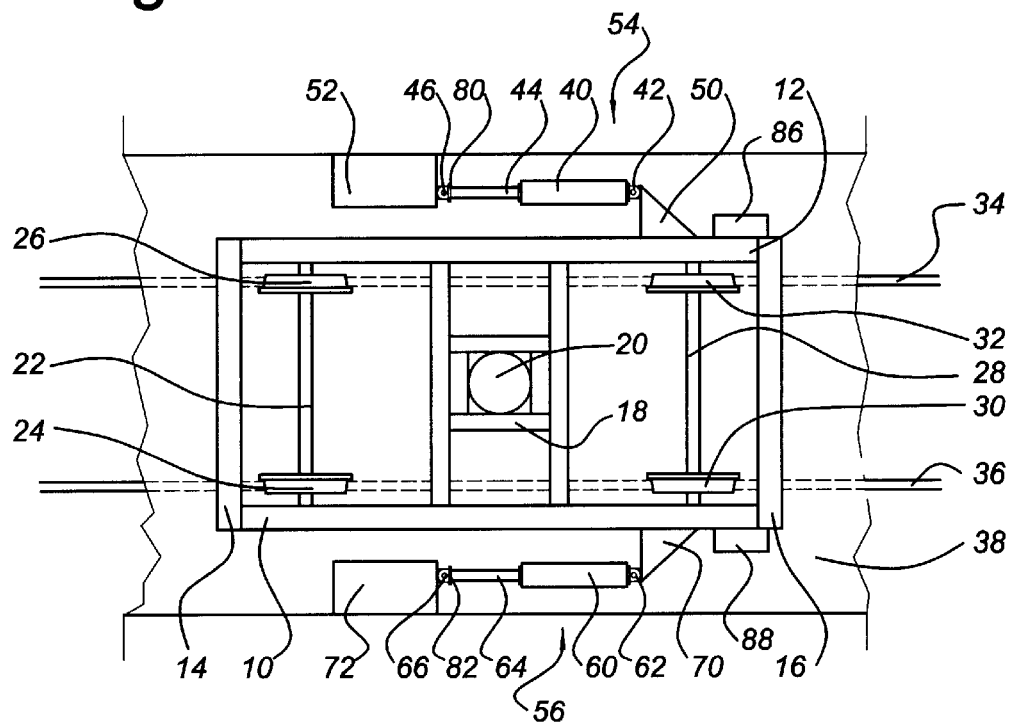
FIG. 5 shows a third embodiment of the invention, in which each damper is provided with a force transducer and the chassis close to each damper is provided with an acceleration transducer in the longitudinal direction of the dampers.

It can happen that the damping characteristic is altered, but the damper force does not alter or only barely alters as a result of the damper speed changing. In order to be able to obtain an indication in these cases also, two acceleration transducers can be used in the manner shown in FIGS. 5 and 6. The two acceleration transducers 86 and 88 are fastened to the two longitudinal members 10 and 12 of the chassis and measure there the acceleration of the chassis at the place where this acceleration is transmitted to the particular damper 54 or 56 respectively.

Figure 6:
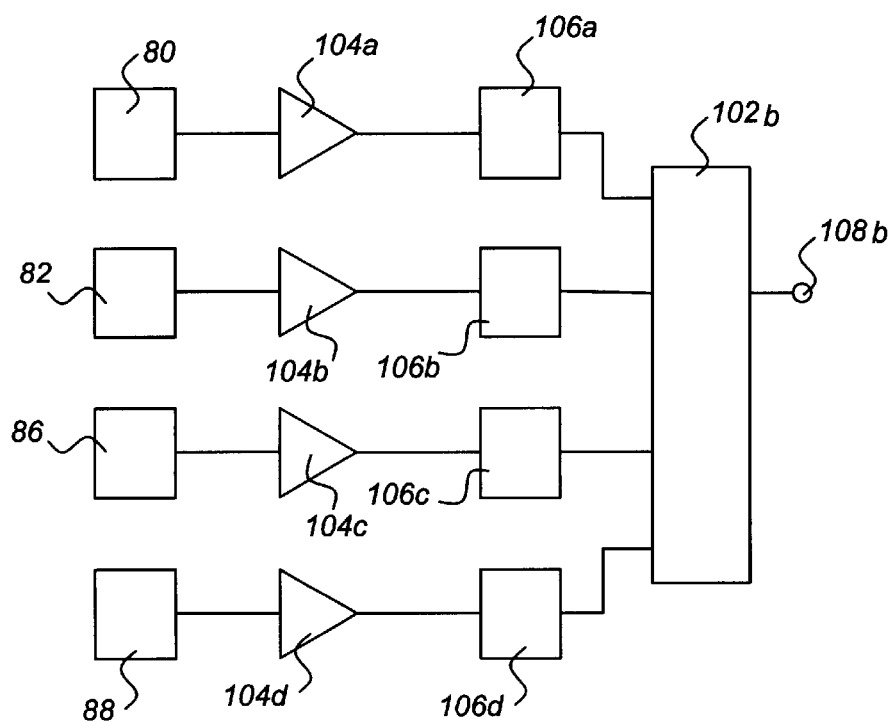
FIG. 6 shows the electronic circuit belonging to the embodiment according to FIG. 5.

As shown in FIG. 6, the signals of the various sensors 80, 82, 86 and 88 are first amplified in the respective amplifiers 104A, 104B, 104C and 104D. All amplified signals are then digitized in the respective D/A converters 106A, 106B, 106C and 106D. The output signals of these converters are fed to a processor 102B. This processor integrates the two acceleration signals, whereby speed signals are obtained, and then calculates the force/speed quotient for both sides. For the damper 54, the signal of the force transducer 80 is therefore divided by the integrated signal of the acceleration transducer 86. For the damper 56, the signal of the force transducer 82 is divided by the integrated signal of the acceleration transducer 88. The resultant quotients are once again compared with each other and must be equal to each other within certain tolerances. In place of acceleration transducers, speed or position transducers can also be used to determine the damper speed.

It will be evident that an application is also possible in which both an acceleration sensor 84 in the transverse direction and two acceleration sensors 86 and 88 in the longitudinal direction of the particular dampers are used.

It is very well possible to compare the measured values or quotients of the dampers of two chassis with each other. In comparing two dampers in a pair, all that can be established is that one of the dampers is no longer functioning perfectly. In a comparison involving two pairs, it can also be established which of the two dampers of a pair is not functioning perfectly.

From the above it can also be deduced that as long as the chassis may be regarded as a rigid body, any failure of a damper can also be read from the displacement of the centre of rotation of the chassis, as can be calculated in a processor programmed for this purpose from the measured values of two transducers with appropriate filters and known positions. In this case, no force transducers on the damper are necessary.

What is claimed is:

1. System for monitoring the working of rotation or roll dampers in rail vehicles, which rail vehicles are provided with a superstructure which rests on at least two chassis, each provided with one or more wheel axles, in which rotation or roll motions which during operation can arise between superstructure and chassis are damper in at least one of the chassis by the said rotation or roll dampers which are mounted between the chassis and the superstructure, one on each side of the chassis, said system comprising: suitable sensors for monitoring the working of the dampers of a chassis, which sensors emit electric signals dependent on the working of the particular damper, means for comparing signals, said means receiving the signals emitted by said sensors, whereby said comparing means compares the signals related to one damper connected to a chassis with the signals related to another damper connected to the same chassis.

2. System according to claim 1, characterized in that the sensor for each damper is formed by at least one force transducer which is connected to the outside of the particular damper.

3. System according to claim 2, characterised in that at least a part of the force transducers is constructed using strain gauge.

4. System according to claim 1, characterised in that the sensor for each damper is formed by at least one force transducer which is fitted inside the particular damper, measures being taken to transfer the signal emitted by the sensor to outside the damper.

5. System according to claim 4, characterised in that characterised in that at least a part of the force transducers is constructed using strain gauges.

6. System according to claims 2–5, characterised in that in addition to the said sensors an acceleration sensor acting in the transverse direction is fitted to the chassis, and wherein the output signal of the transverse acceleration transducer, where necessary following amplification and A/D conversion, is fed to a processor in which this signal is subjected to a spectrum analysis for the purpose of determining the instantaneous roll frequency band, the band filters in the said series circuits are of an adjustable type, and following completion of the said spectrum analysis, the band filters are adjusted to the found frequency band.

7. System according to one of the preceding claims, characterised in that the measured or calculated values are not only compared in respect to the dampers of a chassis but are also compared with the measured or calculated values of the dampers of other chassis.

8. System according to claim 1, characterised in that the output signal of each sensor belonging to a damper is fed to the series circuit of an amplifier and a band filter.

* * * * *